No. 715,651. Patented Dec. 9, 1902.
F. G. FRANKENBERG.
TOBACCO STRIPPING MACHINE.
(Application filed May 24, 1902.)

(No Model.) 7 Sheets—Sheet 1.

Witnesses:-
Howard A Redfield
Minnie Knabjohann

Inventor:
Frederick G. Frankenberg
By Casper L. Redfield
Attorney.

No. 715,651. Patented Dec. 9, 1902.
F. G. FRANKENBERG.
TOBACCO STRIPPING MACHINE.
(Application filed May 24, 1902.)
(No Model.) 7 Sheets—Sheet 2.

Witnesses:
Howard A Redfield
Minnie Knabjohann

Inventor:
Frederick G. Frankenberg
By Casper L. Redfield
Attorney.

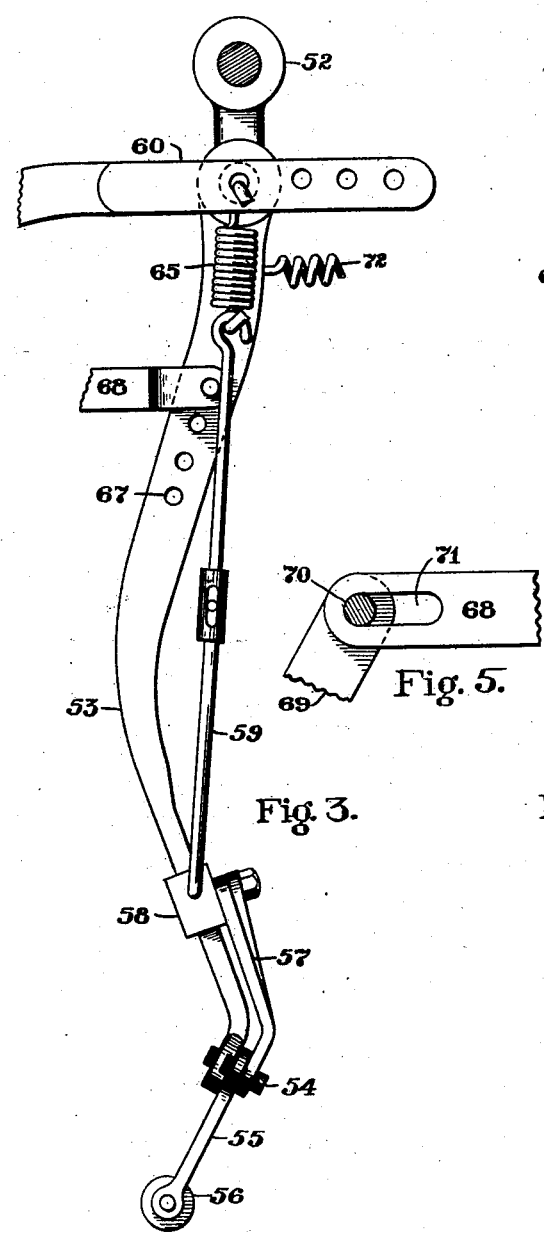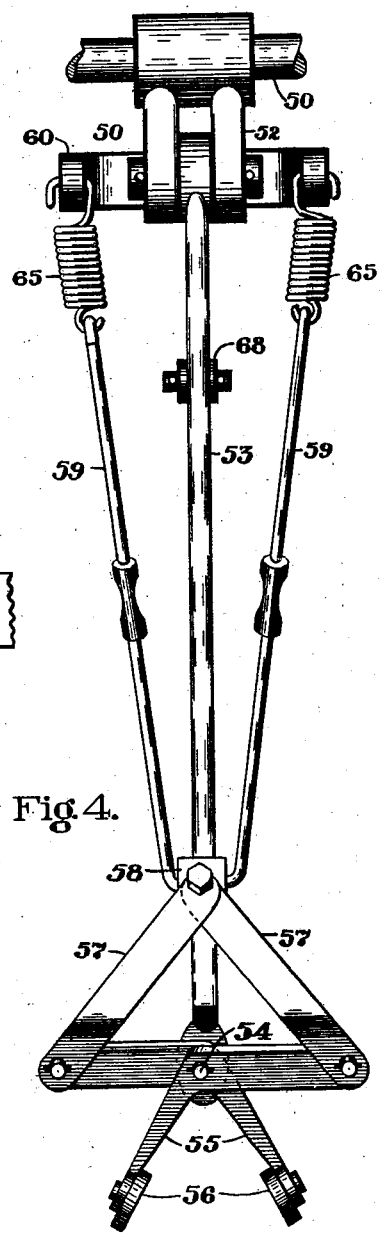

No. 715,651. Patented Dec. 9, 1902.
F. G. FRANKENBERG.
TOBACCO STRIPPING MACHINE.
(Application filed May 24, 1902.)
(No Model.) 7 Sheets—Sheet 4.
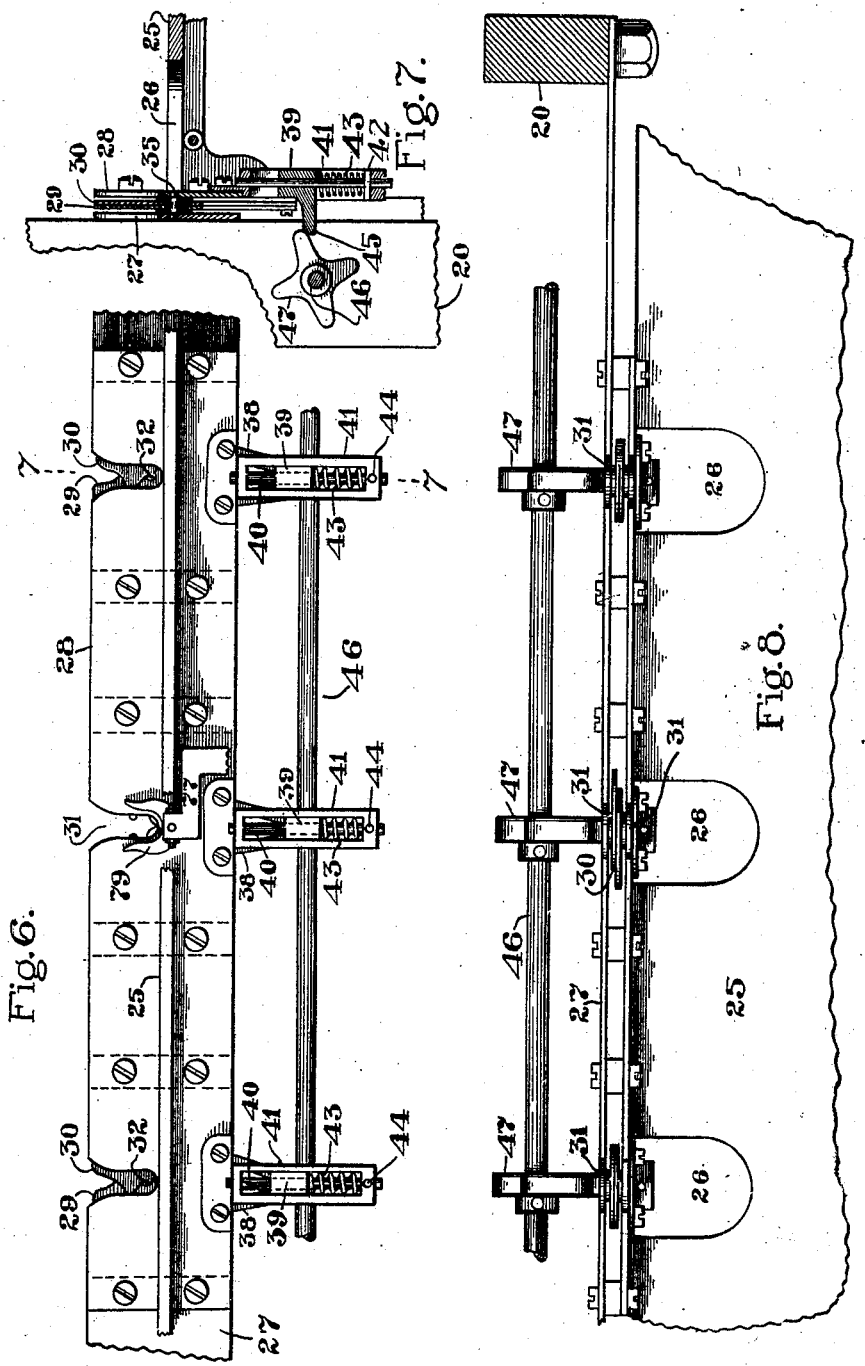
Witnesses:
Howard A. Redfield
Mimi Strabjohann
Inventor:
Frederick G. Frankenberg
By Casper L. Redfield
Attorney.

No. 715,651. Patented Dec. 9, 1902.
F. G. FRANKENBERG.
TOBACCO STRIPPING MACHINE.
(Application filed May 24, 1902.)
(No Model.) 7 Sheets—Sheet 5.
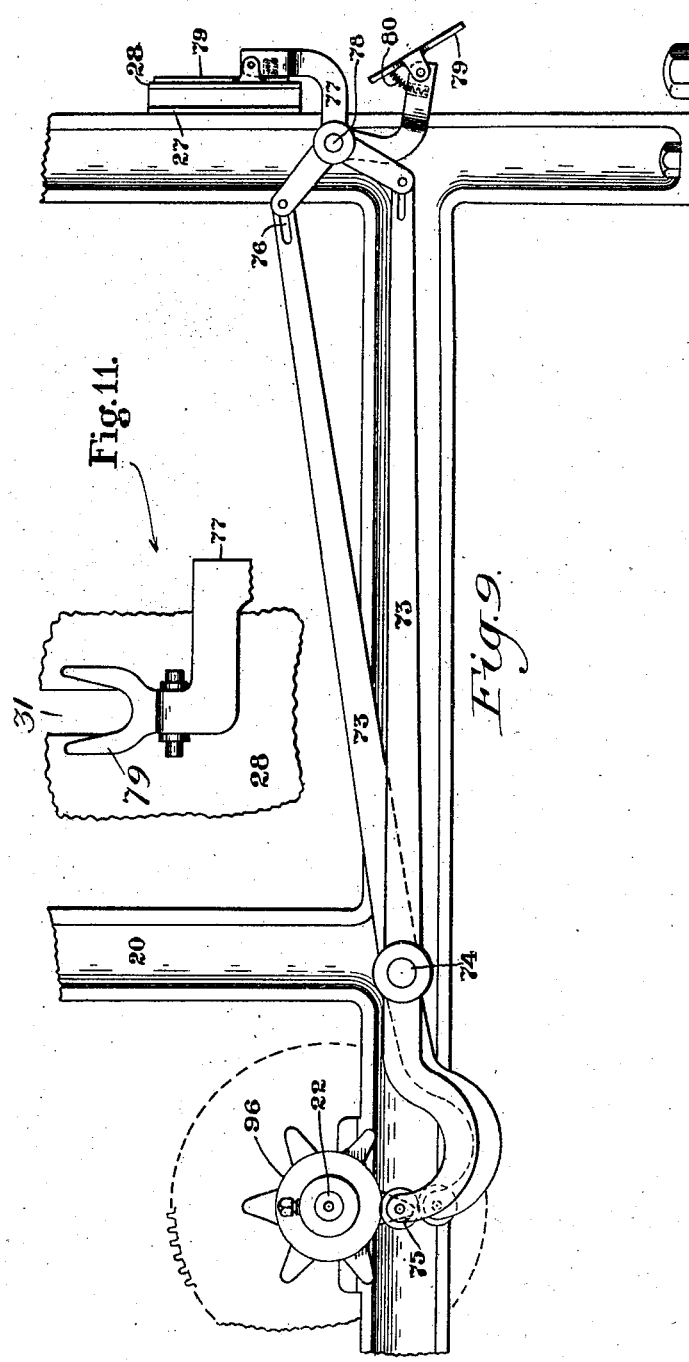
Witnesses:
Howard A Redfield
Minnie Knaljoham
Inventor:
Frederick G. Frankenberg
By Casper L. Redfield.
Attorney.

No. 715,651. Patented Dec. 9, 1902.
F. G. FRANKENBERG.
TOBACCO STRIPPING MACHINE.
(Application filed May 24, 1902.)
(No Model.) 7 Sheets—Sheet 6.
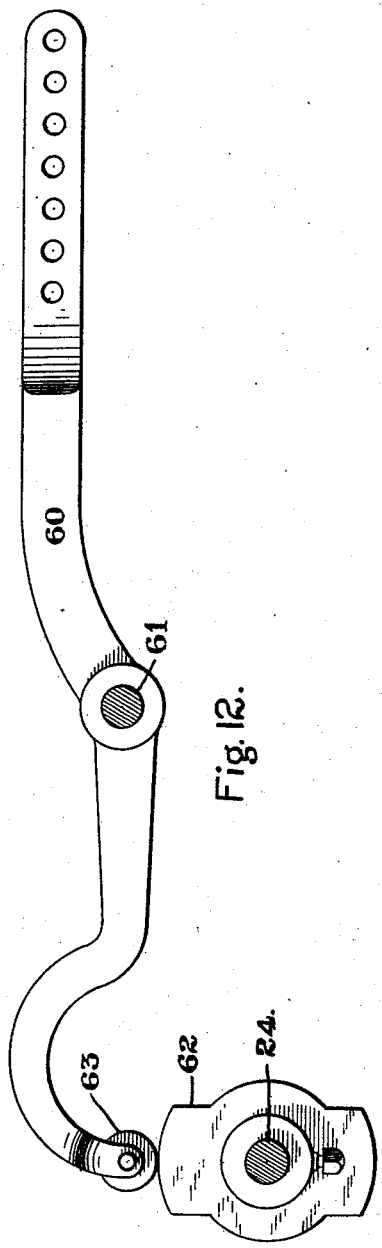
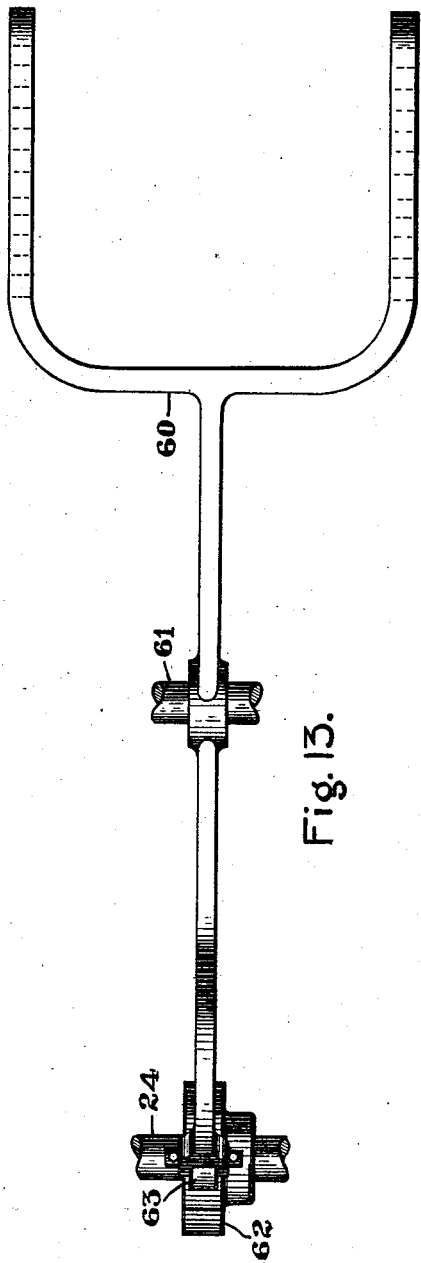
Witnesses:
Howard A. Redfield
Minnie Knabjohann
Inventor:—
Frederick G. Frankenberg
By Casper L. Redfield
Attorney No. 715,651. Patented Dec. 9, 1902.
F. G. FRANKENBERG.
TOBACCO STRIPPING MACHINE.
(Application filed May 24, 1902.)
(No Model.) 7 Sheets—Sheet 7.
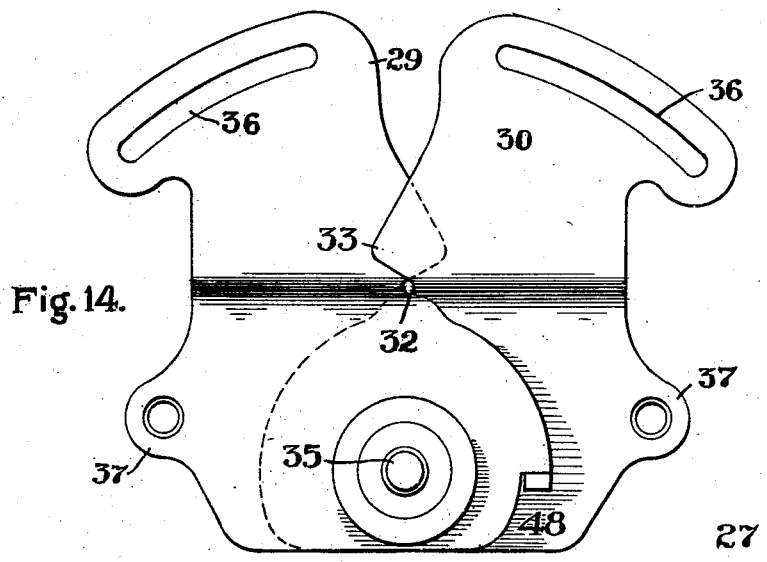
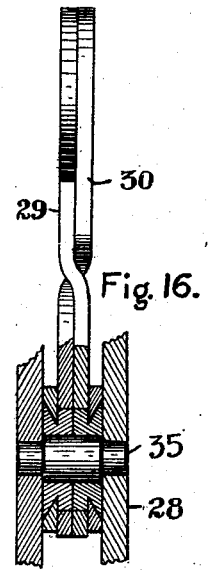
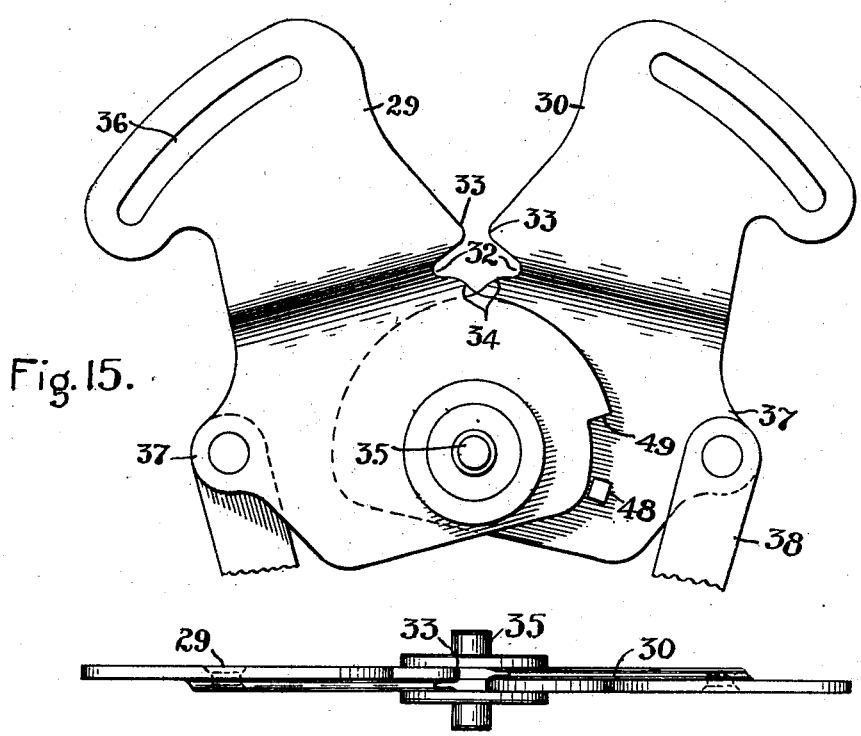
Witnesses: Howard A Redfield, Mimmi Analjohann.
Inventor:— Frederick G. Frankenberg
By Casper L. Redfield.
Attorney
THE NORRIS PETERS CO., PHOTO-LITHO., WASHINGTON, D. C.

UNITED STATES PATENT OFFICE.

FREDERICK G. FRANKENBERG, OF CHICAGO, ILLINOIS, ASSIGNOR TO LANDON-SHARP MACHINE COMPANY, OF CHICAGO, ILLINOIS.

TOBACCO-STRIPPING MACHINE.

SPECIFICATION forming part of Letters Patent No. 715,651, dated December 9, 1902.

Application filed May 24, 1902. Serial No. 108,755. (No model.)

*To all whom it may concern:*

Be it known that I, FREDERICK G. FRANKENBERG, a citizen of the United States of America, and a resident of Chicago, county of Cook, and State of Illinois, have invented certain new and useful Improvements in Tobacco-Stripping Machines, of which the following is a specification.

My invention relates to tobacco-stripping machines, and has for its object improvements in machines for that purpose.

In machines of the class to which the present invention relates the stem of the tobacco-leaf is inserted between knives which open and close, and after the knives are closed the stem is seized by fingers and drawn through the knives, leaving the leaf on one side of the knives and discharging the stem on the other.

Figure 1:
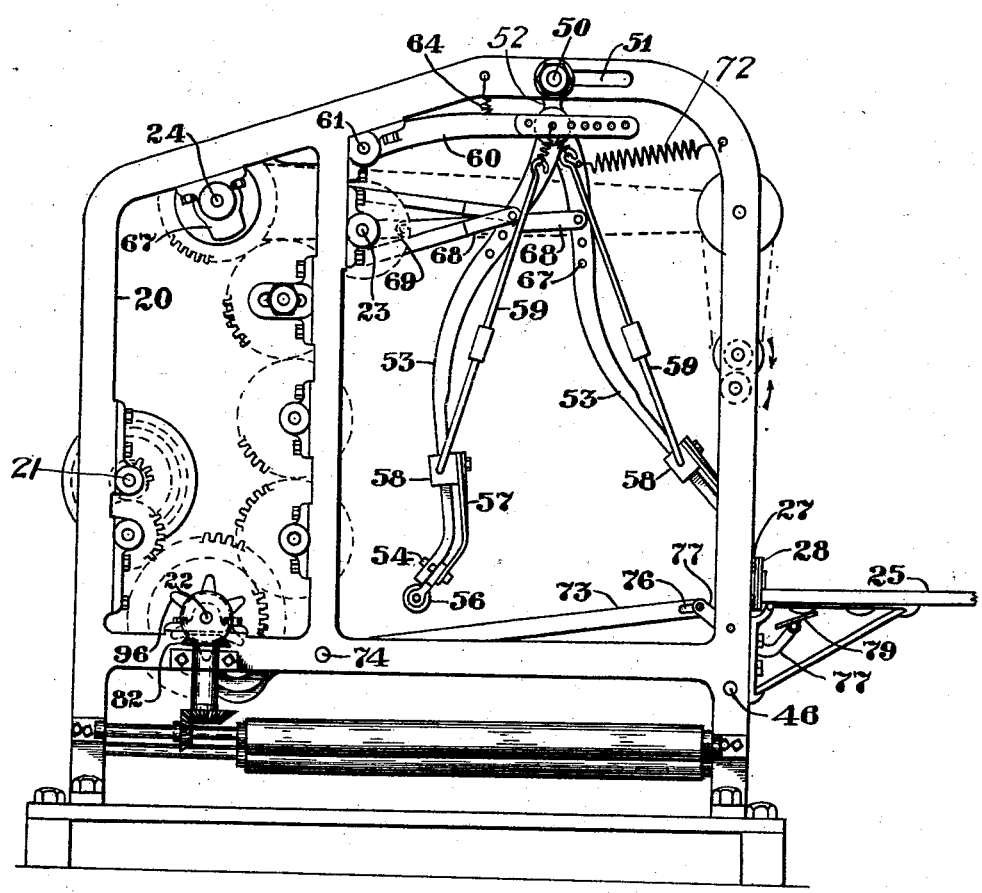
Figure 18:
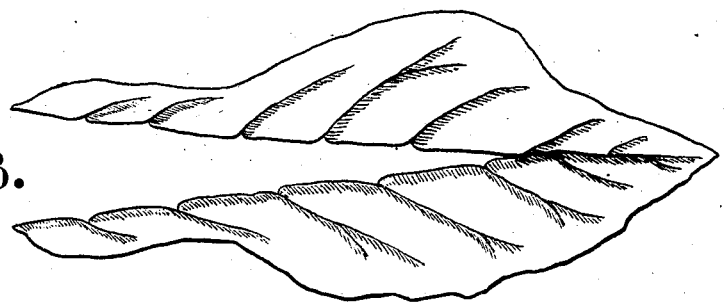
Figure 2:
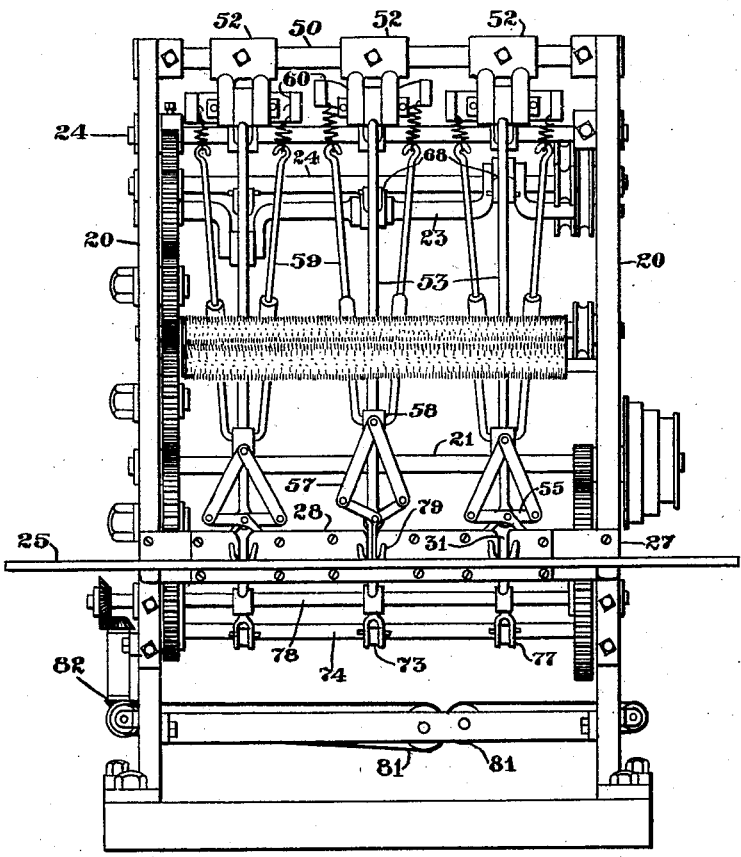

In the accompanying drawings, Figure 1 is a side elevation. Fig. 2 is a front elevation. Fig. 3 is an enlarged side elevation of the arm used in carrying the gripping devices for gripping the stems of the leaves. Fig. 4 is a front elevation of Fig. 3. Fig. 5 is a detail of the crank end of the connecting-rod for operating the lever shown in Figs. 3 and 4. Fig. 6 is a front elevation of the opening through which the stems are inserted, showing the knives and connections thereto. Fig. 7 is a section on line 7 7 of Fig. 6. Fig. 8 is a plan of the devices shown in Fig. 6. Fig. 9 is an enlarged detail of the devices used in discharging the stripped leaf from the machine. Fig. 10 is a plan of the main shaft, showing the star-wheels which drive or operate the mechanism shown in Fig. 9. Fig. 11 is a detail in front elevation of one of the forks for discharging the stripped leaf. Fig. 12 is a side elevation of the cam and lever used in operating the leaf-gripping devices. Fig. 13 is a plan of Fig. 12. Figs. 14 to 17 are enlarged details of the knives used in stripping the leaves, and Fig. 18 is an illustration of one of the leaves after it has been stripped.

In the said drawings, 20 is a frame on which is supported a pulley-shaft 21. From the shaft 21 a train of gears conveys power to a main shaft 22, and from the shaft 22 another train of gears conveys power to a crankshaft 23 and a cam-shaft 24. Secured on the front of the machine is a table 25, in which are a number of openings 26. Between the table and the frame and secured to the latter is a bridge 27, to which is secured a second bridge 28, so arranged as to leave a space between them. Pivoted in the space between the bridges 26 and 27 at points opposite the openings 26 in the table 25 are the stripping-knives 29 and 30. In the bridges or plates 27 and 28 are openings 31 for permitting the stems of leaves to be inserted in the knives 29 and 30. The knives 29 and 30 are shown in Fig. 15 as being open and as being closed in Fig. 14. The said knives consist of two flat blades, which are crossed, so that the knife which is at its lowest part in front will have its upper part in the rear of the other knife. This bending one knife behind another occurs at the place where they are notched out, as shown at 32 in Fig. 15. As will be observed by examination of Fig. 15, it will be seen that if the stem of a leaf is placed between the knives 29 and 30, near the notch 32, when the knives are closed the projections 33 will tend to push the stem down into the notch 32 if said stem is not sufficiently low to be in the line of said notch. If, on the other hand, the stem drops too low, the cam-surface 34 just below the notch 32 tends to raise the stem of the leaf into its proper position in the notches 32. It will therefore be seen that the construction of the knives at and near the point where they grip the stem is such that the closing of the knives will tend to force the stem to its proper position if it is not placed so by hand. The pivot on which these knives turn is marked 35, and with this pivot 35 as a center there are cut in the knives curved slots 36, which act as guides for the knives in the proper plane. Connected to lugs 37 on the knives are two rods 38, which extend downward and connect to a sleeve 39, which is mounted on a rod 40 in a small frame 41. On the rod 40 is a collar 42, Fig. 7, and between the collar 42 and the sleeve 39 is a spring 43. The rod 40 is held in place in the frame 41 by a set-screw 44. It will be apparent from this construction that the spring 43 acts to press the sleeve 39 upward, which sleeve in turn acts to push the rods 38 upward, and thereby close the knives 29 and 30 into the position shown in Fig. 14. On the rear of the sleeve 39 is a lug 45, and running across the machine at the rear of the lugs of each sleeve 39 is a shaft 46, on which there is a star-wheel 47 for each sleeve 39. The shaft 46 is continuously rotated by being driven from the main shaft 22 either by a chain and sprocket-wheel or by a shaft and bevel-gears. (Not shown.) It will therefore be apparent that as the shaft 46 rotates the consequent rotation of the star-wheels 47 will engage the lugs 45, so as to force down the sleeve 39, which in turn will open the knives 29 and 30. When the points of the star-wheels slip off of the lugs 45, the springs 43 will act to close the knives respectively connected thereto. It will also be apparent that by loosening the set-screw 44 and pushing the shaft or rod 40 upward the collar 42 will increase the tension of the springs 43, thereby increasing the tension of the closing action of the knives. On one knife of each pair is a lug 48 and on the other knife of a pair is a projection 49. The projection 49 and the lug 48 are so related to each other as to limit the amount of closing the knives shall have.

Across the upper part of the machine is a shaft 50, which is adjustable in slots 51 in the frames 20. Secured on the shaft 50 are a series of brackets 52, to each of which is pivoted an arm or lever 53. On the lower end of each arm 53 and pivoted on the pin 54 are two bell-crank fingers 55, which have the disks 56 on the ends that close together. From the other end of the bell-cranks 55 pivoted links 57 extend to a block 58, which slides on the arm 53. From the block 58 two adjustable rods 59 extend upward and connect to the forward end of a lever 60, which is pivoted at 61 in the frame 20. On the camshaft 24 are a series of cams 62, which engage rollers 63 on the rear ends of the levers 60. These parts are so related to each other that when the cam 62 pushes the roller 63 upward the forward end of the lever 60 is pushed downward, so as to cause the block 58 to move downward and open the fingers 55, so as to release anything held between the disks 56. A spring 64, attached to the forward end of the lever 60, serves to raise said lever, and consequently the block 58, so as to close the fingers 55. Springs 65 in the connection between the rods 59 and the lever 60 serve to make the gripping action of disks 56 yielding. The blocks 58 are preferably fitted loosely on the levers 53, so that the grippers 55 56 are opened by the gravity of the parts connected thereto. As a consequence of this the springs 65 act only in tension. In the lever 53 are a series of holes 67, to any one of which may be connected a connecting-rod 68, which extends to a crank 69 on the crank-shaft 23. There are shown in the drawings three sets of knives, with corresponding gripping-levers 53, and consequently the shaft 23 will have three cranks 69, which are uniformly spaced around the circle. The end of the connecting-rod 68 which engages the crank-pin 70 on the crank 69 has a slot 71, and attached to the lever 53 is a spring 72, which acts to keep the said slot in the position shown in Fig. 5. When the cranks 69 are rotated, the levers 53 are vibrated between the position adjacent to the knives 29 and 30 and a position to the rear of the knives equal to or greater than the longest leaf that is to be stripped. The cranks 69, the connecting-rods 68, and the levers 53 are so related to each other that when the levers 53 are at the extreme forward stroke the cranks 69 will still have a certain distance to travel in the slots 71. The object of this is to cause the gripping-fingers 55 and 56 to pause at the gripping position long enough for them to close before the commencement of the rearward and stripping movement. The series of holes 67 in the levers 53 are for adjustment, so as to increase or decrease the stroke or movement of the levers 53. The slot 51 in the frame 20 is to permit an adjustment of the pivoting-blocks 52 to correspond to different lengths of stroke. In the levers 60 are also a series of holes, so that the connection 59 from links 57 may join the levers 60 on the axial line of the pivot about which the lever 53 swings. The object of this is so that the swinging of the lever will not tighten or loosen the amount of gripping between the disks 56, as would be the case if the connection between the rods 59 and the levers 60 was at some other point. The disks 56 on the ends of the fingers 55 are pivoted to rotate, so that when the stem of a leaf is gripped between them the said stem will not be bent at the point of gripping by the swinging of the lever 53. The object of this is to prevent the breaking of the stem at or near the point at which it is gripped, which would occur if a sharp bend occurred at that point. For each set of knives there is a lever 73, which is mounted on a shaft 74 in the frame 20. The rear end of the lever 73 is provided with a roller 75, which is engaged by a two-arm cam 96 on the main shaft 22. The forward end of the lever 73 is provided with a slot 76, which engages a pin on a bent arm 77, pivoted on a shaft 78 at the front of the machine and a little below the location of the knives. At the opposite end of the lever 77 there is pivoted a fork 79, which is normally pushed out by a spring 80 into the lower position. (Shown in Fig. 9.) When the cam 96 engages the roller 75, so as to raise the forward end of the lever 73, the fork 79 is in the position described and shown in the lower part of Fig. 9. When, however, the cam passes the roller 75 and the lever 73 drops by gravity, the forward end of the lever 77 is raised upward, so that the fork 79 engages the front bridge 28 and comes in the upper position. (Shown in Fig. 9.) In coming into this position the fork 79 passes through the opening 26 in the table 25 and is supported adjacent to the opening 31 in the bridges 27 and 28. This upper position of the fork 79 is shown in Fig. 11 and also the central part of Fig. 6.

Underneath the mechanism so far described are two belts 81, which are driven by the connections 82 from the main shaft 22, as is illustrated in Fig. 1 and 2. These belts are arranged to convey the stems laterally from under the machine and discharge them at any convenient place. In the front part of the machine above the knives are a pair of brushes, which are driven in any convenient manner, as illustrated by dotted lines representing belts in Fig. 1. These brushes run in a direction illustrated by the arrows in Fig. 1, the object of which is to provide means by which the stems of the leaves are cleaned before being inserted in the knives to be seized by the gripping devices. This is accomplished by simply inserting the stem between the brushes, without letting go of it. Assuming a single pair of knives, with the devices corresponding thereto, these devices are so related to each other that the knives are closed just before the gripping devices reach their forward position and are held closed until the gripping devices have reached their extreme position toward the rear. They then open and are held open until the gripping devices again reach nearly their forward position. The gripping device is opened at or near the extreme rearward position and is closed while at rest in its extreme forward position. The fork 79 in its upward position straddles the opening 31 and the leaf as it is being stripped, and begins its downward movement as soon as the knives open and makes this movement rapidly. The result of this movement is that it carries the stripped leaf through the opening 26 in the table 25 and discharges the stripped leaf into any convenient receptacle supported below the table 25. After it has moved downward it immediately rises again to its upper position and remains there ready to discharge the next stripped leaf. The variation of tension of the spring 43 varies the amount of gripping of the knives 29 and 30 on the stem. When this grip on the stem is light, the leaf will be stripped nearly or quite to the extreme end of the stem. If, however, the spring tension is made greater, there is a greater grip on the stem by the knives 29 and 30, and as a consequence the stem is broken at some point before the leaf is entirely stripped therefrom. It will therefore be seen that by varying the tension of the spring 43 a greater or less amount of stem may be removed, as is desired. The adjustment in lengths of stroke of the levers 53 is to adjust the machine or change it for long or short leaves, as may be desired. The turnbuckles in the rods 59 serve as a means for varying the tension of the springs which connect said rods to the lever 60, which springs vary the gripping force upon the stem of the leaves.

What I claim is—

1. In a tobacco-stripping machine, a pair of stripping blades or knives having cam-surfaces arranged to force the stem of a tobacco-leaf to a fixed position, mechanism for automatically opening said blades so as to permit the stem of a leaf to fall by gravity to a position to be engaged by said cam-surfaces, and means for closing said blades on such stem.

2. In a tobacco-stripping machine, a pair of stripping blades or knives, means for automatically opening said blades so as to permit the insertion of the stem of a leaf, a spring for closing said blades upon the stem, and means for adjusting the tension of said spring so as to vary the pressure on the stem.

3. The combination with a pair of blades for stripping tobacco-leaves, of devices for automatically opening and closing said blades, and means for controlling the movement of said blades whereby the closing action is uniform toward a fixed center.

4. In a tobacco-stripping machine, the combination with a pair of blades arranged to close upon and center the stem of a tobacco-leaf, and a movable stem-gripping device, of means for alternately opening and closing said blades, and means for moving said gripping device so as to cause it to approach said blades at the time they close upon the stem of a leaf.

5. The combination with a pair of blades for stripping tobacco-leaves, of a pivoting-pin, upon which both blades vibrate, parallel plates or bridges for supporting said pin and between which said blades move, a link connected to each blade for moving it and means for operating said links so as to move both blades equally.

6. The combination with a pair of parallel plates or bridges provided with a series of slots or openings for the insertion of the stems of tobacco-leaves, and a table for supporting the leaves when the stems are so inserted, of a pair of stripping-knives located at each slot and supported between said bridges, and means for opening and closing said knives.

7. In a tobacco-stripping machine, a pair of stripping-knives having means to center the stem of a tobacco-leaf at a definite point, a lever and means for vibrating it to and from the point at which the stem is centered, gripping-fingers carried on said lever, and means for operating said gripping-fingers so as to draw the stem through said stripping-knives.

8. In a tobacco-stripping machine, the combination with a pair of gripping-fingers and devices for automatically opening and closing them, of a disk loosely pivoted on each finger at the gripping-point, substantially as described.

9. In a tobacco-stripping machine, a leaf-stripping device, a movable gripping device arranged to draw the stems of tobacco-leaves through said stripping device, and means for varying the length of movement of said gripping device.

10. The combination with a leaf-stripping device, of grippers adapted to seize the stem of a leaf placed in said device, means for opening and closing said grippers, a spring for controlling the pressure of the grippers on the stem, means for varying the tension of said spring, and mechanism connected to said grippers for moving them to and from the stripping device.

11. A pivoted lever and means for vibrating it, a gripping device supported at the free end of said lever, and rods for operating said gripping device, said rods being controlled from points in the axis of the pivot about which said lever vibrates whereby such vibration does not affect the action of said gripping device.

12. The combination with leaf-stripping devices, of a stem-gripping device, means for moving the gripping device to and from the stripping device, and means for causing the movement of the gripping device to pause an appreciable period of time when in proximity to said stripping device.

13. A leaf-stripping device, a stem-gripping device, a pivoted lever on which the gripping device is carried, means for vibrating said lever on its pivot so as to move the gripping device to and from the stripping device, means for adjusting the length of the lever-vibrations, and means for adjusting the position of the pivot for said lever so as to correspond to the length of vibration.

14. In a tobacco-stripping machine, the combination with a series of leaf-stripping devices and a corresponding series of grippers for drawing the stems of leaves through the stripping devices, of cranks and connecting-rods for moving the grippers to and from the stripping devices in sequence.

15. The combination with a stripping device adapted to receive the stem of a tobacco-leaf, and a table adjacent thereto for supporting the leaf when the stem is so inserted, said table being provided with an opening therethrough, of a device for moving the stripped leaf away from the stripping device and discharging it through the opening in said table.

16. The combination with leaf-stripping devices, gripping devices, and mechanism for moving said devices so as to strip leaves from their stems, of means for adjusting said devices so that they will automatically remove a greater or less amount of stem as may be desired.

17. In a tobacco-stripping machine, the combination with a pair of blades arranged to close upon and center the stem of a tobacco-leaf, of a stem-gripping device, and means for moving said gripping device to and from said blades.

Signed at Chicago, Illinois, this 7th day of May, 1902.

FREDERICK G. FRANKENBERG.

Witnesses:
WM. A. ROWLAND,
CASPER L. REDFIELD.